United States Patent Office 3,560,527
Patented Feb. 2, 1971

3,560,527
β-LACTONES OF (1-HYDROXYPERFLUOROCYCLO-ALKYL)ACETIC ACIDS AND PREPARATION THEREOF
Richard F. Sweeney, Dover, and Alson K. Price, Morristown, N.J., assignors to Allied Chemical Corporation, New York, N.Y.
No Drawing. Filed Aug. 9, 1967, Ser. No. 659,338
Int. Cl. C07d 3/00
U.S. Cl. 260—343.9
11 Claims

ABSTRACT OF THE DISCLOSURE

Fluorinated lactones having the formula:

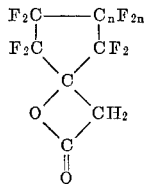

wherein $n$ may be 0–2 are prepared by dehydrating a corresponding (1-hydroxyperfluorocycloalkyl)acetic acid having the formula

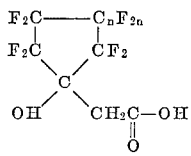

with phosphorus pentoxide.

The fluorinated lactones may also be prepared by heating a corresponding acid chloride of the above-described acids to decomposition, or by heating a mixture of such an acid with thionyl chloride, in the presence of an organic tertiary amine catalyst, for a period of time, and at a sufficiently high temperature, to form the corresponding subject fluorinated lactone. The fluorinated lactones may be converted to surface active unsaturated acids by reaction with anhydrous sulfuric acid.

CROSS-REFERENCES TO RELATED APPLICATIONS

U.S. application of Alson K. Price and Richard F. Sweeney, entitled "Novel Fluorinated Acids," Ser. No. 526,023, filed Feb. 9, 1966 now U.S. Pat. 3,427,349.

U.S. application of Alson K. Price and Richard F. Sweeney, entitled "Novel Fluorinated Acids and Derivatives Thereof," Ser. No. 659,340, filed Aug. 9, 1967.

BACKGROUND OF THE INVENTION

This invention relates to novel fluorinated lactones of the formula:

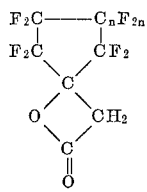
(I)

wherein $n$ may be 0–2 and methods for preparation thereof. These lactones are useful as precursors to useful surface active agents which are disclosed in U.S. Patent 3,427,349 mentioned supra and in co-pending application of Alson K. Price and Richard F. Sweeney, Ser. No. 659,340, filed Aug. 9, 1967, mentioned supra.

SUMMARY OF THE INVENTION

Above Formula I encompasses three species of fluorinated lactones, viz. (1 - hydroxydecafluorocyclohexyl) acetic acid-β-lactone; (1 - hydroxyoctafluorocyclopentyl) acetic acid-β-lactone and (1-hydroxyhexafluorocyclobutyl) acetic acid-β-lactone.

The novel fluorinated lactones may be prepared by dehydrating a (1-hydroxyperfluorocycloalkylacetic acid of the formula:

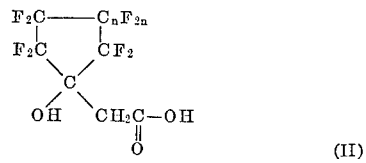
(II)

wherein $n$ has the afore-stated meaning, with phosphorus pentoxide. The reaction may be carried out simply by heating a mixture of the lactone and phosphorus pentoxide, at atmospheric pressure, until the fluorinated lactone product distills off. At least one mol of phosphorus pentoxide per mol of hydroxy-acetic acid starting material should be employed. The reaction proceeds best when an excess of phosphorus pentoxide is employed however, for reasons of economics, no advantage accrues when molar ratios higher than 3:1 phosphorus pentoxide per mol of hydroxy-acetic acid starting material are employed. The preferred molar ratio for use in this reaction is 2–3 mols phosphorus pentoxide per mol of hydroxy-acetic acid starting material.

A temperature of at least about 90° C. is required to maintain a significant decomposition rate in this reaction although decomposition will take place at slower rates at temperatures significantly below 90° C. Use of temperatures above the boiling points of the particular hydroxy-acetic acid starting materials involved give excellent results.

Purification may be achieved by ordinary distillation means or by gas liquid chromatographic separation.

The hydroxy-acetic acid starting materials of Formula II may be prepared by reacting a perfluorocycloalkanone with malonic acid in the presence of a tertiary amine solvent such as pyridine. The molar ratio of malonic acid to perfluorocycloalkanone in this reaction should be between about 1–2:1. The quantity of tertiary amine solvent is not critical. The reaction is exothermic and reaction temperatures are not critical except, at the outset, they should be maintained below the boiling point of the ketone employed in order to avoid undue loss of the ketone. Temperatures between about 10–25° C. during the ketone addition are satisfactory. After addition of the ketone the reaction may be conveniently and efficiently carried out at above ambient temperatures and up, for example, to the reflux temperature of the solvent. The reaction proceeds efficiently at atmospheric pressure. The product hydroxy-acetic acid, which is a crystalline material, may be recovered by conventional procedures which may, in one embodiment for example, be accomplished by acidification of the reaction solution, followed by extraction with ethyl ether, and by water washing and water removal. The ethyl ether extractant may be separated from the hydroxy-acetic acid product by diluting with petroleum ether and evaporating. Additional separatory procedures may be employed to further purify the product. This process is discussed in more detail in co-pending application of Alson K. Price et al., entitled "Novel Fluorinated Acids," Ser. No. 526,023, filed Feb. 9, 1966, now U.S. Pat. 3,427,349.

Phosphorus pentoxide is a well known material and is commercially available.

The fluorinated lactones of Formula I may also be prepared by decomposing corresponding acid chlorides of the (1-hydroxyperfluorocycloalkyl)acetic acids of Formula II. This may be accomplished simply by heating the acid chlorides to a temperature sufficient to effect the composition. The reaction takes place in the absence of a catalyst. A small amount of decomposition will take place even at room temperature, about 25° C. At more elevated temperatures, higher decomposition rates are obtained and preferred decomposition temperatures lie in the range of about 100–150° C.

Decomposition is effectively accomplished at atmospheric pressure, although super- and sub-atmospheric pressures could be used if desired.

The decomposition reaction is catalyzed by the presence of an organic tertiary amine such as pyridine, triethylamine, quinoline and quinuclidine. Any of a number of amines belonging to this well known class may be employed.

If a catalyst is employed the molar ratio of acid chloride to catalyst should lie between about 1–10:1.

When catalysts are employed high decomposition rates are obtained at lower temperatures. With high concentrations of catalyst for example, high decomposition rates are obtained at temperatures between about 25–50° C. The lower the catalyst concentration the higher the temperature which is needed in order to accelerate decomposition.

The acid chloride starting materials of (1-hydroxyperfluorocycloalkyl)acetic acids of Formula II may be prepared by reaction of the acids with thionyl chloride with or without the presence of an organic tertiary amine catalyst such as those described above. Catalyst concentrations are not critical. Only small amounts are needed to catalyze the reaction. At least an equimolar amount of the thionyl chloride reactant should be employed and the reaction proceeds best at moderately elevated temperatures, for example, in the range of about 40–80° C.

Other conventional means may be utilized to produce the subject acid chlorides.

The fluorinated lactones of Formula I may be prepared in a one-step reaction by heating a (1-hydroxyperfluorocycloalkyl)acetic acid of Formula II with thionyl chloride in the presence of a catalytic amount of an organic tertiary amine catalyst as described above at a temperature, catalyst concentration and period of time sufficient to form the lactone.

The reaction of the acids of Formula II with thionyl chloride to produce the corresponding acid chlorides and the decomposition of the acid chlorides so produced to the corresponding lactones will take place simultaneously. Depending on reaction conditions, either the acid chloride or lactone products can be favored. At lower temperatures, lower concentrations of catalyst and shorter reaction periods, the acid chlorides are favored and decomposition to the lactones is minimized. This is so even though a small amount of decomposition of the acid chlorides to the corresponding lactones will take place even as low as room temperature. There is accordingly no precise cutoff in temperature, catalyst concentration or reaction time which will result in the production of either the subject acid chlorides or the subject corresponding lactones, to the exclusion of the other.

Generally, decomposition of the acid chlorides to the corresponding lactones is favored at temperatures of about 75° C. and above, at catalyst to acid chloride concentrations of about 1:1–10 parts by weight and at reaction times of at least about 6 hours. Temperatures between about 25–50° C. tend to disfavor decomposition of the acid chlorides unless catalyst concentrations are very high. At temperatures at which the lactones distill, virtually all of the acid chloride will be decomposed thereto.

When low catalyst concentrations are employed, for example in the range of about .1–.25% by weight of the reaction mixture, predominant amounts of the lactone product still can be favored by use of temperatures above about 75° C. and reaction times of at least about 6 hours. Conversely, with low catalyst concentrations of the order indicated, predominant amounts of the acid chloride product can be favored by use of temperatures well below 75° C. and at short reaction times.

Recovery and purification of the fluorinated lactone products of the invention may be accomplished by conventional distillation means and also by gas liquid chromatographic separation.

The fluorinated lactones of the invention have utility as precursors to the corresponding surface active unsaturated acids and salts of the formula:

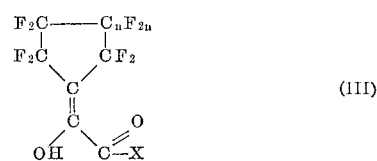

(III)

wherein $n$ is 0–2 and X is OH or OM, wherein M is an alkali metal, alkaline earth metal, or —$NH_4$.

The fluorinated lactones may be converted to the surface active unsaturated acids of Formula III wherein X is OH, by reaction with anhydrous sulfuric acid. This reaction is exothermic and may be efficiently carried out by heating the reactants to reflux temperature. The product which distills off is the unsaturated acid. Weight ratios of lactone to sulfuric acid in this reaction should lie between about 1:1–1:4.

The unsaturated acids, in turn, may be converted to the corresponding salts of Formula III wherein X is as indicated above by reaction with an inorganic base, such as NaOH, Ca(OH)$_2$ or NH$_4$OH. The reaction takes place readily at room temperatures. An amount of base should be employed which is sufficient to neutralize all the acid present. The inorganic base should be used in aqueous solution. The solid salt product may be readily isolated from the reaction mixture solution by evaporation of the solution to dryness on a steam bath.

Both the unsaturated acids and unsaturated acid salts have surface active properties and may be used as anti-wetting agents and as emulsifying agents in conventional manner. The unsaturated acids and acid salts are disclosed in more detail in our copending application entitled "Novel Fluorinated Acids and Derivatives Thereof," Ser. No. 659,340, filed Aug. 9, 1967.

The fluorinated lactones of Formula I may also be converted to their hydroxy-acetic acids having the Formula II by decyclization with an alkali such as NaOH. The reaction is exothermic. Purification of the hydroxy-acetic acid products may be accomplished by conventional means such as, for example, ether extraction from an acid solution.

The hydroxy-acetic acids and corresponding acid chlorides have varied uses as oleophobic agents, nematocides and sealing adjuvants for films of polymers, terpolymers and copolymers of trifluorochloroethylene, as described more in detail in our copending application entitled "Novel Fluorinated Acids," Ser. No. 526,023, filed Feb. 9, 1966, now U.S. Pat. 3,427,349.

DESCRIPTION OF THE PREFERRED EMBODIMENTS

Example I

A mixture of 5.0 grams (0.015 mol) of (1-hydroxyperfluorocyclohexyl)acetic acid and 4.20 grams (0.03 mol) of phosphorus pentoxide was heated in a micro distillation apparatus until 3.9 grams of distillate (B.P. 135–145° C.) were collected. Gas liquid partition chromatographic analysis showed the distillate to be 95% pure (1-hydroxydecafluorocyclohexyl)acetic acid-β-lactone. The yield was 77%.

Analysis.—Calculated for $C_8H_2O_2F_{10}$ (percent): H, 0.63; F, 59.4. Found (percent): H, 0.66; F, 58.92.

Infrared spectrographic analysis showed a lactone carbonyl absorption band at 5.3 thereby confirming the identity of the structure.

Example II

A sample of (1-hydroxyperfluorocyclohexyl)acetyl chloride, 5 grams, is passed through a gas chromatographic column at a temperature of 100–150° C. Decomposition of the sample takes place. The resulting decomposition product is identified as (1-hydroxydecafluorocyclohexyl acetic acid-β-lactone which is confirmed by comparison of its infrared spectrum with that of an authentic sample derived in accordance with Example I.

EXAMPLE III

A mixture of 3.0 grams (0.009 mol) of (1-hydroxyperfluorocyclohexyl)acetic acid, 1.92 grams (0.016 mol) of thionyl chloride and 2 drops of pyridine was heated for a period of 7 hours during which period the temperature of the mixture was raised from 26° C. to 41° C. Infrared analysis of the resulting mixture indicated that most of the starting hydroxy acetic acid had been converted to the corresponding hydroxy acetic acid chloride. Attempts to isolate a pure sample of the acid chloride by gas liquid partition chromatography were unsuccessful. The sample eliminated hydrogen chloride on the chromatographic column to give predominantly the corresponding lactone. A portion of the reaction mixture was then added to carbon tetrachloride. Refrigeration of this solution caused unreacted hydroxy acetic acid to deposit leaving the acid chloride in the supernatent liquid. The infrared spectrum of this solution exhibited a hydroxyl absorption band at 2.83μ and a band corresponding to the acid chloride function at 5.64μ. No acid or lactone bands were present. Further heating of the original reaction mixture for 6 hours at 75° C. caused about 30% of the hydroxy acetic acid chloride to be converted to the corresponding lactone.

When other starting materials, as described above, containing 4 and 5 carbon atoms in the cyclic moiety are employed, similar results are obtained.

We claim:
1. A fluorinated lactone of the formula:

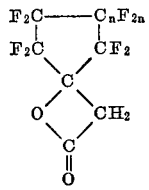

wherein n may be 0–2.

2. A fluorinated lactone according to claim 1 which is (1-hydroxydecafluorocyclohexyl)acetic acid-β-lactone.

3. A fluorinated lactone according to claim 1 which is (1-hydroxyoctafluorocyclopentyl)acetic acid-β-lactone.

4. A fluorinated lactone according to claim 1 which is (1-hydroxyhexafluorocyclobutyl)acetic acid-β-lactone.

5. The process for making a compound as described in claim 1 which comprises heating, to its decomposition point, a starting material consisting essentially of an acid chloride having the formula:

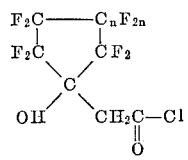

wherein n is 0–2.

6. The process of claim 5 which is conducted in the presence of a catalytic amount of an organic tertiary amine.

7. The process of claim 6 in which the organic tertiary amine catalyst is pyridine.

8. The process of claim 7 in which n is 2.

9. The process of claim 7 in which n is 1.

10. The process of claim 7 in which n is 0.

11. The process of claim 5 which is carried out in the absence of a catalyst.

References Cited

UNITED STATES PATENTS 2,202,437   5/1940   Stoll _____ 260—343

FOREIGN PATENTS 1,214,211   4/1966   Germany _____ 260—343.9

OTHER REFERENCES

Weissbwyer: Heterocyclic Compounds, Part II, Interscience, 1964 (pp. 796–797 relied on).

Wagner and Zook: Synthetic Organic Chemistry, p. 546.

ALEX MAZEL, Primary Examiner

A. M. T. TIGHE, Assistant Examiner

U.S. Cl. X.R.
260—514, 544